(12) United States Patent
Rinklake

(10) Patent No.: US 8,684,140 B2
(45) Date of Patent: Apr. 1, 2014

(54) CENTRIFUGAL CLUTCH

(75) Inventor: Kai Rinklake, Neuwied (DE)

(73) Assignee: Skylotec GmbH, Neuwied (DE)

( * ) Notice: Subject to any disclaimer, the term of this patent is extended or adjusted under 35 U.S.C. 154(b) by 252 days.

(21) Appl. No.: 13/265,150

(22) PCT Filed: Mar. 30, 2010

(86) PCT No.: PCT/EP2010/002026
§ 371 (c)(1),
(2), (4) Date: Dec. 6, 2011

(87) PCT Pub. No.: WO2010/121698
PCT Pub. Date: Oct. 28, 2010

(65) Prior Publication Data
US 2012/0067670 A1    Mar. 22, 2012

(30) Foreign Application Priority Data
Apr. 21, 2009  (DE) .................... 20 2009 005 927 U

(51) Int. Cl.
*E06C 7/18* (2006.01)
*A62B 1/10* (2006.01)

(52) U.S. Cl.
USPC .................... 182/231; 188/185; 192/105 BB

(58) Field of Classification Search
USPC ..... 192/105 BB, 105 BA, 103 B, 223.1, 53.6, 192/71; 188/184, 185; 182/234, 235, 231; 187/373, 376; 242/247, 289, 297, 301
See application file for complete search history.

(56) References Cited

U.S. PATENT DOCUMENTS

| | | | | |
|---|---|---|---|---|
| 2,995,226 A | * | 8/1961 | Gilder | 192/223.1 |
| 3,696,901 A | * | 10/1972 | Henry | 192/105 BA |
| 4,087,885 A | * | 5/1978 | Gillentine | 16/325 |
| 4,736,829 A | * | 4/1988 | Noel | 192/71 |
| 4,797,075 A | * | 1/1989 | Edwards et al. | 188/185 |
| 5,740,894 A | | 4/1998 | Buchanan, Jr. | |
| 6,007,152 A | * | 12/1999 | Kojima et al. | 297/367 R |
| 6,520,583 B1 | * | 2/2003 | Bonk | 192/223.1 |
| 2008/0142296 A1 | * | 6/2008 | Jean | 182/5 |

FOREIGN PATENT DOCUMENTS

FR    2521860 A1    8/1983

* cited by examiner

*Primary Examiner* — Rodney Bonck
(74) *Attorney, Agent, or Firm* — DeLio, Peterson & Curcio, LLC; Robert Curcio

(57) ABSTRACT

A centrifugal clutch having a rotor, a clutch component, and at least one centrifugal weight movable relative to the rotor. When the rotational speed of the rotor is below a predefined value, the centrifugal weight is in a first position and at a distance from the clutch component so that the rotor can rotate freely relative to the clutch component and, when the rotational speed of the rotor is above a predefined value, the centrifugal weight executes a movement relative to the rotor under a centrifugal force into a second position so that the centrifugal weight produces a mechanical force fit between the rotor and the clutch component. The centrifugal weight has first toothing and the clutch component a second toothing so that the first toothing, above the predefined rotational speed, engages into the second toothing, establishing a form-locking connection between the rotor and the clutch component.

20 Claims, 5 Drawing Sheets

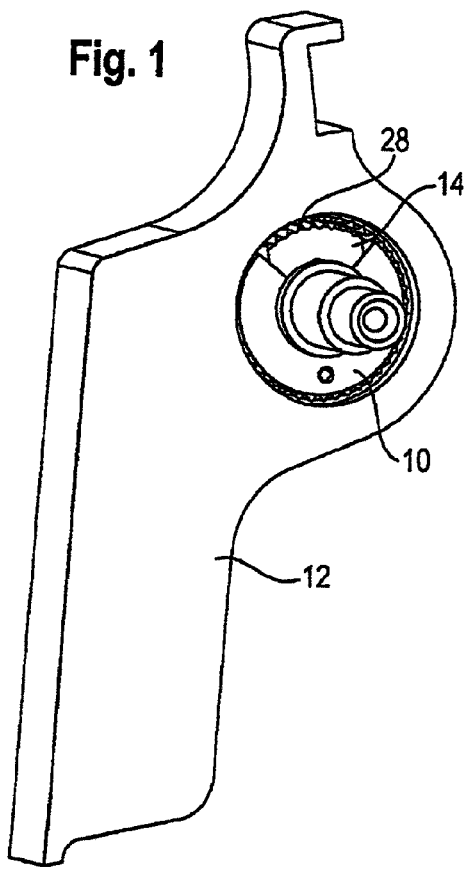
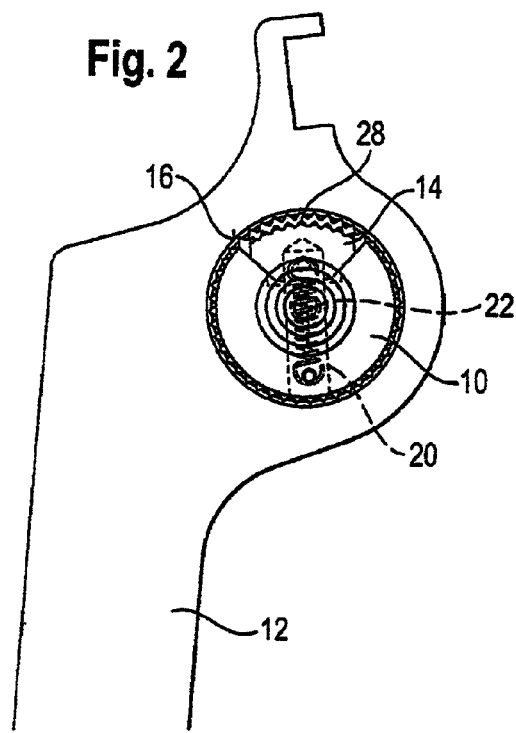

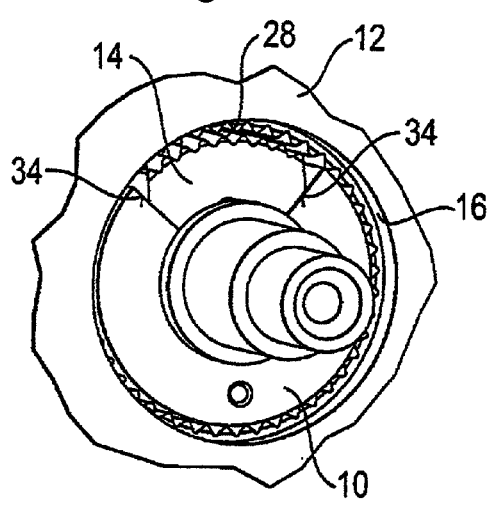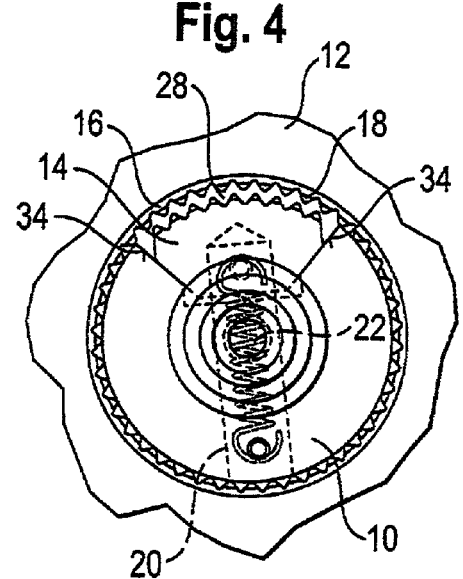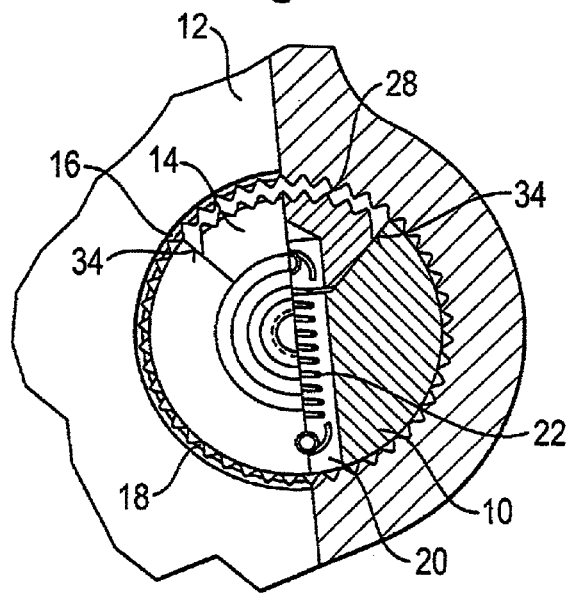

US 8,684,140 B2

CENTRIFUGAL CLUTCH

This application is a National Stage filing based on PCT/EP2010/002026, filed Mar. 30, 2010, and which claims priority to German Patent Application No. DE 20 2009 005 927.8, filed Apr. 21, 2009.

BACKGROUND OF THE INVENTION

1. Field of the Invention

The present invention relates to a centrifugal clutch having a rotor and having a clutch component, wherein at least one centrifugal weight is arranged on the rotor so as to be movable relative to the rotor, and is designed such that below a predetermined rotational speed of the rotor, the centrifugal weight is arranged spaced apart from the clutch component on the rotor in a first position such that the rotor is freely rotatable relative to the clutch component, and above the predetermined rotational speed of the rotor, said centrifugal weight performs a movement relative to the rotor under a centrifugal force into a second position such that the centrifugal weight produces mechanical non-positive engagement between the rotor and the clutch component. The invention also relates to a fall arrester, in particular climbing protection runner, which runs, in accompaniment with a person to be secured, on a movable or fixed guide which serves as a safety device, in particular a safety rail, climbing protection ladder or safety rope, having a centrifugal clutch.

2. Description of Related Art

A centrifugal clutch serves for the automatic rotational-speed-dependent production of a non-positive connection between a rotor and a clutch component. In certain applications, the centrifugal clutch must be very small with regard to the installation space requirement, and simultaneously be able to transmit high forces between the rotor and the clutch component. Such applications are for example fall arresters or climbing protection runners with an automatic fall arresting function. In the case of conventional centrifugal clutches, the transmission of force is realized in that the centrifugal force pushes corresponding centrifugal weights radially outward against a housing until the contact pressure generates adequate frictional engagement. For this purpose, both a high rotational speed and also a certain diameter are necessary in order to generate sufficient centrifugal force and also accommodate sufficient mass in the centrifugal weights. Since the clutch for a fall arrester must however be particularly small, there is a conflict of aims.

BRIEF SUMMARY OF THE INVENTION

The invention is based on the object of improving a centrifugal clutch of the above-stated type such that reliable non-positive engagement between the rotor and the clutch component is obtained even with small geometric dimensions and at low rotational speeds.

Said object is achieved according to the invention by means of a centrifugal clutch of the above-stated type, and by means of a fall arrester of the above-stated type. Advantageous refinements of the invention are described in the claims.

In a first aspect, the present invention is directed to a centrifugal clutch comprising: a rotor; a clutch component having a first toothing; at least one centrifugal weight arranged on the rotor so as to be movable relative to the rotor, such that below a predetermined rotational speed of the rotor, the centrifugal weight is spaced apart from the clutch component in a first position such that the rotor is freely rotatable relative to the clutch component, and above the predetermined rotational speed of the rotor, the centrifugal weight performs a movement relative to the rotor under a centrifugal force into a second position such that the centrifugal weight produces mechanical non-positive engagement between the rotor and the clutch component, the centrifugal weight including a second toothing such that, above the predetermined rotational speed, the first toothing and the second toothing mesh with one another and thereby produce a positive connection between the rotor and the clutch component.

The centrifugal clutch may include the second toothing formed on a surface, which faces toward the clutch component above the predetermined rotational speed, of the centrifugal weight. The first toothing may be formed on a wall, which faces toward the centrifugal weight, of the clutch component. The first toothing and the second toothing may also be of identical design.

The centrifugal clutch may have a spring element for forcing the centrifugal weight in the direction of the first position. The rotor may include a bore in which the spring element is arranged. The bore may be perpendicular to a longitudinal axis of the rotor.

The centrifugal weight may comprise a ring segment of the rotor. The clutch component may radially surround the rotor. The centrifugal weight may be supported on at least one surface of the rotor, the at least one surface being arranged in a plane parallel to a longitudinal axis of the rotor.

In a second aspect, the present invention is directed to a fall arrester, which runs, in accompaniment with a person to be secured, on a movable or fixed guide which serves as a safety device, climbing protection ladder, or safety rope, having a centrifugal clutch, including the centrifugal clutch of the aforementioned type.

The invention will be explained in more detail herein below with reference to the drawings, in which:

FIG. 1 shows a preferred embodiment of a centrifugal clutch according to the invention in a perspective view;

FIG. 2 shows the centrifugal clutch according to FIG. 1 in a side view;

FIG. 3 shows a detail view of the centrifugal clutch according to FIG. 1 in a perspective view;

FIG. 4 shows a detail view of the centrifugal clutch according to FIG. 2 in a side view;

FIG. 5 shows a detail view of the centrifugal clutch according to FIG. 2 in a partially sectional illustration;

DETAILED DESCRIPTION OF THE INVENTION

Figure 6:
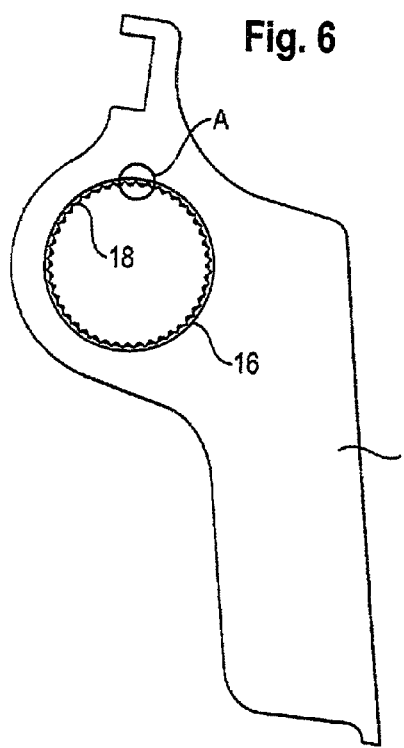
FIG. 6 shows a side view of a clutch component of the centrifugal clutch according to FIG. 1 in the form of a housing.
Figure 7:
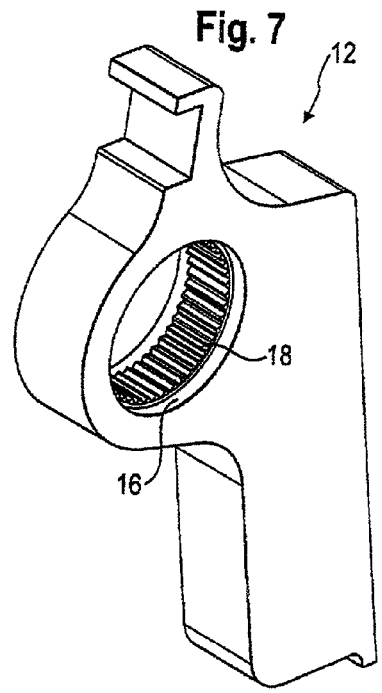
FIG. 7 shows the clutch component according to FIG. 6 in a perspective view.

In a centrifugal clutch of the above-stated type, it is provided according to the invention that the centrifugal weight has a first toothing and the clutch component has a second toothing, in such a way that, above the predetermined rotational speed, the first toothing and the second toothing mesh with one another and thereby produce a positive connection between the rotor and the clutch component.

This has the advantage that, using a geometrically small centrifugal clutch with a small installation space requirement, it is possible to transmit particularly high forces between the rotor and the clutch component, and to obtain an effective non-positive and positive connection, even at low values for the predetermined rotational speed of the rotor.

The first toothing is expediently formed on a surface, which faces toward the clutch component above the predetermined rotational speed, of the centrifugal weight.

In one preferred embodiment, the second toothing is formed on a wall, which faces toward the centrifugal weight, of the clutch component.

Particularly effective non-positive engagement with toothings which mesh with one another in a flush manner is obtained by virtue of the first toothing and the second toothing being of identical design.

Secure hold of the centrifugal weight in or close to the first position below the predetermined rotational speed of the rotor is obtained by virtue of a spring element being provided which forces the centrifugal weight in the direction of the first position. The rotor preferably has a bore in which the spring element is arranged. The bore is for example formed perpendicular to a longitudinal axis of the rotor.

A particularly functionally reliable embodiment is obtained by virtue of the centrifugal weight being formed as a ring segment of the rotor.

A clamping, positive connection between the rotor and the clutch component through an oblique plane is obtained by virtue of the centrifugal weight being supported on at least one, in particular two surfaces of the rotor, said surface being arranged in a plane parallel to a longitudinal axis of the rotor.

In a fall arrester of the above-stated type, it is provided according to the invention that the centrifugal clutch is designed as described above.

This has the advantage that a fall arrester is provided which has small dimensions while at the same time having a highly effective fall arresting mechanism.

The preferred embodiment of a centrifugal clutch according to the invention illustrated in FIGS. 1 to 5 comprises a rotor 10, a clutch component 12 and a centrifugal weight 14. The embodiment with only one centrifugal weight is merely an example. It is also possible for two, three or more centrifugal weights to be provided in the manner of the centrifugal weight 14 illustrated and described below, in particular so as to be distributed uniformly over the circumference of the rotor 10. The clutch component 12 is designed as a housing with an inner wall 16 which completely surrounds the rotor 10. A toothing 18 is formed on an inner side, which faces toward the rotor 10, of the inner wall 16. Furthermore, a bore 20 for receiving a spring element 22, for example a helical spring, is formed in the rotor 10.

Figure 9:
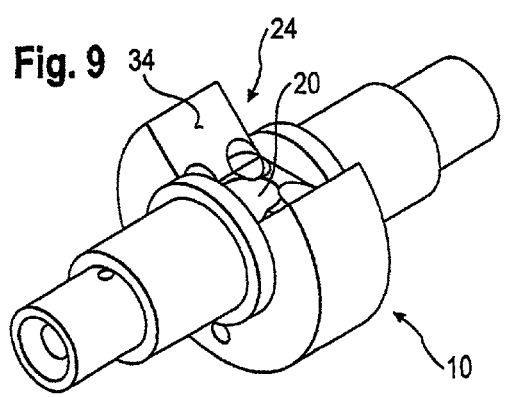
FIG. 9 shows a rotor of the centrifugal clutch according to FIG. 1 in a perspective view.
Figure 10:
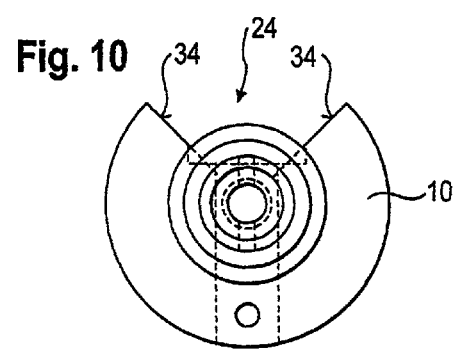
FIG. 10 shows the rotor according to FIG. 9 in a front view.
Figure 11:
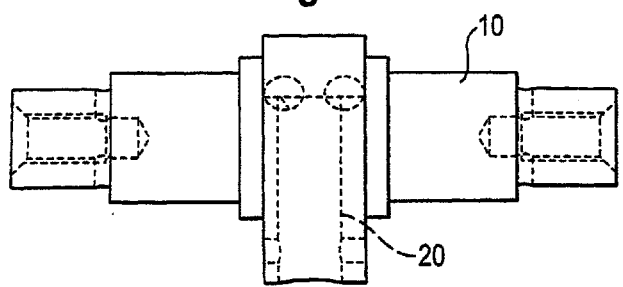
FIG. 11 shows the rotor according to FIG. 9 in a side view.
Figure 12:
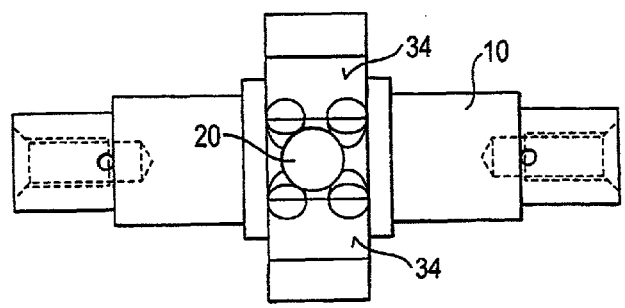
FIG. 12 shows the rotor according to FIG. 9 in a further side view.
Figure 13:
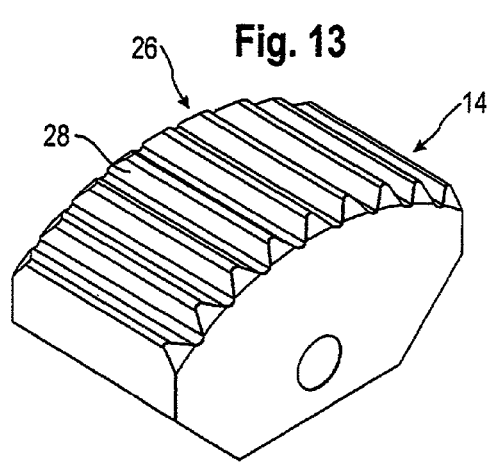
FIG. 13 shows a centrifugal weight of the centrifugal clutch according to FIG. 1 in a perspective view.
Figure 14:
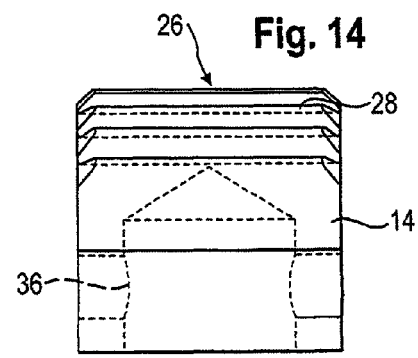
FIG. 14 shows the centrifugal weight according to FIG. 10 in a side view.
Figure 15:
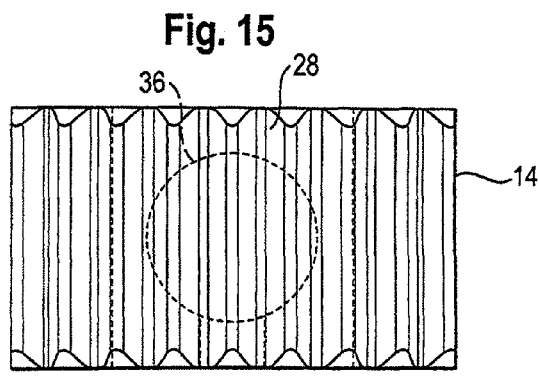
FIG. 15 shows the centrifugal weight according to FIG. 10 in a plan view.
Figure 16:
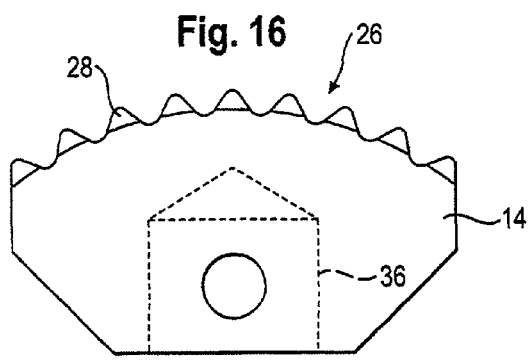
FIG. 16 shows the centrifugal weight according to FIG. 10 in a front view.

As can be seen in particular from FIGS. 9 to 11, the rotor 10 is cut out over a predetermined axial length in the region of a ring segment 24. Said predetermined axial length of the ring segment cutout 24 substantially corresponds to an axial length of the inner wall 16 of the clutch part 12, or is slightly shorter.

As can be seen in particular from FIGS. 13 to 16, the centrifugal weight 14 is designed so as to substantially correspond to the ring segment cutout 24 of the rotor 10. In this way, the centrifugal weight 14 fits into the ring segment cutout 24 of the rotor 10 such that, when the centrifugal weight 14 is arranged in a first position relative to the rotor 10 as illustrated in FIGS. 1 to 3, at a side 26, which faces toward the inner wall 16 of the clutch part 12, of the centrifugal weight 14, the dimensions of the centrifugal weight 14 in the radial direction with respect to the rotor 10 remain within an outer circumference of the rotor 10 in the region of the ring segment cutout 24 of the rotor 10. In other words, the centrifugal weight 14 inserted into the ring segment cutout 24 of the rotor 10 does not project beyond the rotor 10 in the radial direction when the centrifugal weight is situated in the first position illustrated for example in FIG. 4.

A first toothing 28 is formed on the side 26 of the centrifugal weight 14. Said first toothing 28 substantially corresponds to the second toothing 18 of the clutch component 12. In the first position, the first and second toothings do not mesh with one another, such that the rotor 10 is freely rotatable within the clutch component 12.

The centrifugal weight 14 is mechanically connected to the rotor 10 via the spring element 22. Said spring element 22 is elastically deformable and is arranged and designed so as to force the centrifugal weight 14 radially in the direction of the first position. In other words, the spring element 22 is preloaded under tension. In this way, the centrifugal weight 14 is situated in or close to the first position as long no force acts on the centrifugal weight 14 in the radial direction or a small force acts on the centrifugal weight 14 in the radial direction, which force is smaller than the restoring force of the spring element 22 at the location of the centrifugal weight in a second position spaced apart from the first position, wherein the second position will be explained in more detail below. With increasing rotational speed, as a result of rotation of the rotor 10, an ever increasing centrifugal force acts on the centrifugal weight 14 in the radial direction away from the first position toward a second position (not illustrated) of the centrifugal weight 14, in which the centrifugal weight 14 abuts against the inner wall 16 of the clutch component 12 and the first and second toothings 28, 18 mesh with one another. Since it is the case that, with increasing elongation of the spring element 22 in the radial direction, the restoring force of the spring element 22 also increases, the movement of the centrifugal weight 14 in the radial direction does not take place abruptly from the first position into the second position when a certain rotational speed of the rotor 10 is reached, but said movement rather takes place in a continuous fashion with increasing rotational speed of the rotor 10. Here, the rate of change of the rotational speed determines how suddenly or abruptly the movement of the centrifugal weight 14 in the radial direction takes place. When, at a predetermined rotational speed of the rotor 10, the centrifugal force is equal to or greater than the force, which has a restoring action radially in the direction of the first position, of the spring element 22 at the location of the second position of the centrifugal weight 14, the centrifugal weight 14 has moved in the radial direction into the second position under the action of the centrifugal force, and the first toothing 28 and the second toothing 18 mesh with one another. This produces a positive connection between the rotor 10 and the clutch component 12, wherein as a result of the not only frictional connection, such as is provided in conventional centrifugal clutches, it is possible by means of the positive connection for high forces to be transmitted between the rotor 10 and the clutch component 12 substantially independently of the rotational speed of the rotor 10 as long as the rotational speed is above the predetermined rotational speed.

Figure 8:
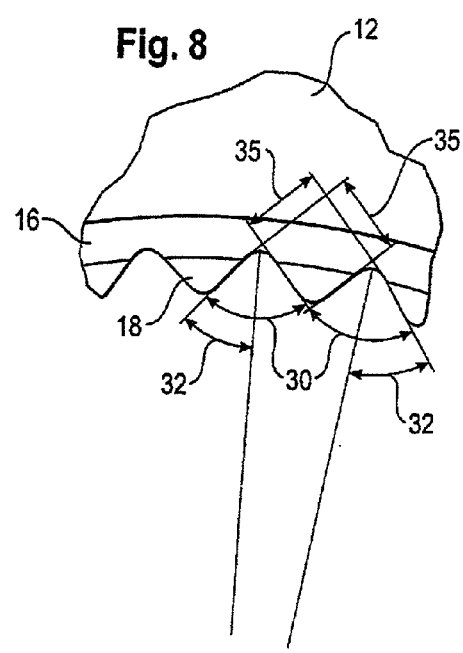
FIG. 8 shows a detail view of the region A of FIG. 6.

As is illustrated in FIG. 8 by way of example for the second toothing 18, the first and second toothings 28, 18 have a predetermined flank angle 30 of for example 70° to 90°, in particular 80°, or a flank half-angle 32 of for example 35° to 45°, in particular 40°. Furthermore, the first and second toothings 28, 18 have a flank length 35 of for example 0.5 mm to 2 mm, in particular 1 mm.

The design of the centrifugal weight 14 as a ring segment of the rotor 10 yields two contact surfaces 34, which are oblique with respect to a longitudinal axis of the bore 20, between the centrifugal weight 14 and the ring segment cutout 24 of the rotor 10. Said contact surfaces 34 define planes in space which are in each case parallel to the longitudinal axis of the bore. The centrifugal weight 14 moves on one of said oblique contact surfaces 34, depending on the direction of rotation of the rotor 10, during the transition from the first position into the second position. This has the effect that, when the centrifugal weight 14 abuts against the inner wall 16 of the clutch component 12, the pressure force of the centrifugal weight 14 against the inner wall 16 of the clutch component 12 resulting from the centrifugal force is not aligned perpendicular to the inner wall 16 of the clutch component 12 over the entire region of meshing of the first toothing 28 into the second toothing 18 or over the entire side 26 of the centrifugal weight 14. On account of increased friction between flanks, which are abutting against one another, of the toothings 28, 18, this results in clamping of the meshing of the first and second toothings 28, 18 with one another. This advantageously has the effect that, in the event of even a slight exceedance of the predetermined rotational speed or activation speed of the rotor 10 at which the centrifugal force is equal to or greater than the force, which has a restoring action radially in the direction of the first position, of the spring element 22 at the location of the second position of the centrifugal weight 14, intense non-positive engagement is realized between the rotor 10 and the clutch component 12 on account of the positive connection between the rotor 10 and clutch component 12 by means of the intermeshing toothings 28, 18 in conjunction with the respective oblique contact surface 34. In this way, it is possible to construct a small centrifugal clutch which produces a non-positive and positive connection already at a low rotational speed and in the event of a slight exceedance of the predetermined rotational speed or activation rotational speed of the rotor 10.

As can be seen in particular from FIGS. 13 to 16, the centrifugal weight 14 likewise has a bore 36 which is aligned with the bore 20 in the rotor 10. The spring element 22 is arranged so as to extend into the bore 35 of the centrifugal weight 14.

While the present invention has been particularly described, in conjunction with the specific preferred embodiment(s), it is evident that many alternatives, modifications, and variations will be apparent to those skilled in the art, in light of the foregoing description. It is therefore contemplated that the appended claims will embrace any such alternatives, modifications, and variations as falling within the true scope and spirit of the present invention. Thus, having described the invention, what is claimed is:

The invention claimed is:

1. A centrifugal clutch comprising:
a rotor having at least one wedge cutout with oblique contact surfaces;
a clutch component having a first toothing;
at least one centrifugal weight arranged within said at least one wedge cutout of the rotor so as to be movable relative to the rotor, such that below a predetermined rotational speed of the rotor, the centrifugal weight is spaced apart from the clutch component in a first position such that the rotor is freely rotatable relative to the clutch component, and above the predetermined rotational speed of the rotor, said centrifugal weight performs a movement relative to the rotor under a centrifugal force into a second position such that the centrifugal weight produces contact between the rotor and the clutch component, the centrifugal weight including a second toothing such that, above the predetermined rotational speed, the first toothing and the second toothing mesh with one another and thereby produce a positive connection between the rotor and the clutch component.

2. The centrifugal clutch of claim 1 including the second toothing formed on a surface, which faces toward the clutch component above the predetermined rotational speed, of the centrifugal weight.

3. The centrifugal clutch of claim 2, wherein the first toothing is formed on a wall, which faces toward the centrifugal weight, of the clutch component.

4. The centrifugal clutch of claim 3 including the first toothing and the second toothing being of identical design.

5. The centrifugal clutch of claim 4 including a spring element for forcing the centrifugal weight in the direction of the first position.

6. The centrifugal clutch of claim 5 wherein the rotor includes a bore in which the spring element is arranged.

7. The centrifugal clutch of claim 5 wherein the centrifugal weight comprises a ring segment of the rotor.

8. The centrifugal clutch of claim 6 wherein the centrifugal weight comprises a ring segment of the rotor.

9. The centrifugal clutch of claim 5 wherein the clutch component radially surrounds the rotor.

10. The centrifugal clutch of claim 1, wherein the first toothing is formed on a wall, which faces toward the centrifugal weight, of the clutch component.

11. The centrifugal clutch of claim 1 including the first toothing and the second toothing being of identical design.

12. The centrifugal clutch of claim 1 including a spring element for forcing the centrifugal weight in the direction of the first position.

13. The centrifugal clutch of claim 12 wherein the rotor includes a bore in which the spring element is arranged.

14. The centrifugal clutch of claim 13 wherein the bore is perpendicular to a longitudinal axis of the rotor.

15. The centrifugal clutch of claim 1 wherein the centrifugal weight comprises a ring segment of the rotor.

16. The centrifugal clutch of claim 15 wherein the centrifugal weight is supported on at least one surface of the rotor, said at least one surface being arranged in a plane parallel to a longitudinal axis of the rotor.

17. The centrifugal clutch of claim 1 wherein the clutch component radially surrounds the rotor.

18. The centrifugal clutch of claim 17 wherein the centrifugal weight is supported on at least one surface of the rotor, said at least one surface being arranged in a plane parallel to a longitudinal axis of the rotor.

19. A fall arrester, which runs, in accompaniment with a person to be secured, on a movable or fixed guide which serves as a safety device, climbing protection ladder, or safety rope, having a centrifugal clutch, including the centrifugal clutch of claim 1.

20. A centrifugal clutch comprising:
a rotor having at least one wedge cutout with substantially straight oblique contact surfaces;
a clutch component having an inner wall and a first toothing;
at least one centrifugal weight arranged within said at least one wedge cutout of the rotor so as to be movable relative to the rotor, such that below a predetermined rotational speed of the rotor, the centrifugal weight is spaced apart from the clutch component in a first position such that the rotor is freely rotatable relative to the clutch component, and above the predetermined rotational speed of the rotor, said centrifugal weight performs a movement relative to the rotor under a centrifugal force into a second position such that said centrifugal weight moves on one of the substantially straight oblique contact surfaces, which has the effect that, when the centrifugal weight abuts against said inner wall of said clutch, the pressure force of said centrifugal weight against said inner wall is not aligned perpendicular to said inner wall over the entire region of meshing or over the entire side of the centrifugal weight.

\* \* \* \* \*